Patented Nov. 14, 1950

2,529,602

UNITED STATES PATENT OFFICE 2,529,602

ION EXCHANGE MATERIAL AND METHOD OF MAKING THE SAME

Stanley H. Frohmader, Madison, Wis., assignor to Research Products Corporation, Madison, Wis., a corporation of Wisconsin No Drawing. Application September 2, 1948, Serial No. 47,540

9 Claims. (Cl. 252—193)

This invention relates to improvements in ion exchange materials which are resinous in character and have improved properties for use in cation exchange. The invention also relates to the method of making such ion exchange material and the method of effecting cation exchange in solutions by contacting the solutions with such an ion exchange material.

It is the object of the invention to provide a resinous cation exchange material which has high stability and exchange capacity and is insoluble in water and the solutions in which it may be used to effect ion exchange.

In accordance with the present invention, it has been discovered that an artificial resin composed of the product of reacting formaldehyde and naphthalene sulfonic acid, at least approximately 75% of which acid is in the alpha form, possesses valuable properties such as high stability and exchange capacity. Cation exchange resins composed of naphthalene sulfonic acid and formaldehyde reaction products have been known heretofore but they have been composed predominantly of the beta sulfonic acid product and in accordance with the present invention it has been discovered that the predominantly alpha sulfonic acid product possesses pronouncedly superior rigidity, toughness, stability and exchange properties in comparison with the beta sulfonic acid product. Also, in accordance with the present invention it has been discovered that the acid content of the resin exchange material during manufacture affects the exchange properties and the invention provides an acid content which produces the most advantageous result in this respect.

The resin exchange material of this invention may be used to effect cation exchange in water, as for example to soften hard water, or in other solutions, as for example to convert sodium chloride in solution to hydrochloric acid. These are merely examples of applications which may be made and many others are possible in accordance with procedures known to those skilled in the ion exchange art. After the exchange material has become exhausted of its exchange capacity, it may be regenerated by contacting it with a solution of a suitable salt or acid.

The following is an example of a method which may be used for making the improved resin ion exchange material of the invention. In a closed container equipped with an agitator one mol of naphthalene is mixed with 1.0 to 3.0 mols of sulfuric acid in the form of a concentrated aqueous solution, for example, a solution containing 98% by weight of $H_2SO_4$. The mixture is agitated and heated at a temperature not in excess of 110° C. and preferably between 70° C. and 90° C. and maintained at that temperature with agitation until the naphthalene has been substantially completely converted to naphthalene sulfonic acid. When the preferred temperature range is employed, the composition of the resulting naphthalene sulfonic acid is approximately 90% alpha acid and 10% beta acid, and when a temperature of 110° C. is used the proportions are approximately 75% alpha acid and 25% beta acid.

The naphthalene sulfonic acid is added to 1.0 to 2.5 mols of formaldehyde in the form of an aqueous solution of formaldehyde, for example, a solution containing 37% by weight of formaldehyde, the addition being carried out in a closed container equipped with an agitator and a cooling jacket. The resulting reaction is exothermic and the rate of introduction of the sulfonic acid is controlled and the container is cooled in such manner that the reaction temperature does not exceed 100° C. and preferably is between 65° C. and 80° C. It is preferred to add the naphthalene sulfonic acid to the formaldehyde rather than to add the formaldehyde to the sulfonic acid because the former procedure tends to avoid local overheating which has been found to impair the properties of the final product. The reaction is continued with agitation until it has progressed to the point where a noticeable increase occurs in the viscosity of the mixture, when the agitation is stopped. Until this time, the mass is freely liquid, and by the time a thickening is observed the exothermic character of the reaction has decreased considerably. The reaction is believed to involve both condensation and polymerization.

The reaction is continued and the mass is heated, in an oven or otherwise, at the same temperature, that is, a temperature not exceeding 100° C. and preferably between 65° C. and 80° C. until a solid, substantially water insoluble resinous product is obtained. The operation is carried out in a manner such that the temperature of the mass is substantially uniform throughout its volume.

The solid resin product contains absorbed sulfuric acid since an excess of acid over that theoretically required was used in the sulfonation step. The product is washed with water to remove the sulfuric acid. The washing is preferably continued until the residual acidity expressed as $H_2SO_4$, is from 0.3 pound less to 0.4 pound more, per pound of naphthalene, than the amount theoretically required to produce naphthalene monosulfonic acid. The optimum amount is 0.1 pound more than the said theoretical amount. The washed material is then baked at a temperature not exceeding 150° C. to dry and indurate the same. Baking at a temperature of from 130° C. to 150° C. for approximately one hour produces excellent results. During each of the heating operations described the reaction between the formaldehyde and the naphthalene sulfonic acid proceeds until the final indurated product is obtained. The product is then ready for use in ion exchange for which purpose it is reduced to granules of a suitable size, for example, graded from 14 to 48 mesh Tyler standard screen scale. The operation of reducing to granules may precede the washing and baking operations if desired.

The granules are hard, rigid and tough and capable of withstanding the use and handling to which they are subjected without any appreciable loss by attrition. When placed in water they form a bed which is pervious, and water or the desired solution may be passed through it readily. The material is substantially insoluble in water and neutral solutions and the acid solutions commonly used for regeneration in hydrogen exchange. In these respects it is greatly superior to the product known heretofore and composed predominantly of naphthalene beta sulfonic acid, formaldehyde resin. The latter product is relatively soft and weak and of a gelatinous consistency. An objectionable amount of fines is produced in handling. In addition, the granules swell to several times their dry size and become further softened when they are immersed in water, as a result of which a bed of the granules in use possesses a low degree of perviousness so that the liquids pass through it only with difficulty. Also, the material is not water insoluble and when in contact with water imparts a dark coloration to it. As another advantage, the product of the present invention exhibits an exchange capacity of approximately 1.5 to 2.0 times the exchange capacity of the product known heretofore.

The granular material is first charged with the cations which it is desired to impart to the water or solution to be treated by passing a solution of a compound containing such cations in contact with a bed of the material. For softening hard water, a solution of sodium chloride is first passed in contact with the material whereby it is charged with sodium ions. It is then washed free of the excess sodium chloride solution and the water to be softened is passed in contact with it whereby the well-known cation exchange reaction occurs by which the water is softened. After the capacity of the material is exhausted, it is regenerated by again passing in contact with it a sodium chloride solution, and the procedure may be repeated cyclicly. If it is desired to effect cation exchange in a different solution, the material is first charged with the cation which it is desired to impart to the solution in exchange for the cations therein. The material is adapted for hydrogen exchange, in which procedure it is charged with hydrogen ions by contacting it with a dilute solution of an acid, such as sulfuric acid.

The above is an example of a procedure for forming and using the naphthalene sulfonic acid, formaldehyde resin ion exchange material composed predominantly of the alpha sulfonic acid, and many variations may be made therein. For example, in the sulfonation of the naphthalene, the concentration of the sulfuric acid solution may be varied, but it is preferred to use a high concentration of between 95% and 100% $H_2SO_4$ because the reaction proceeds more rapidly than it does when using a less concentrated solution. Oleum containing more than 100% $H_2SO_4$ may also be used. Other known sulfonating agents may be used, such as chlorosulfonic acid, fluosulfonic acid, sodium trihydrogen disulfate, pyridine sulfotrioxide, methyl sulfate, etc. The temperature of sulfonation may also be varied, but at low temperatures the reaction is slow and at excessively high temperatures increased amounts of the beta form of the naphthalene sulfonic acid is formed, and to avoid the formation of objectionable amounts of the beta acid, it is desired to keep the temperature below 110° C. and preferably between 70° C. and 90° C. as described heretofore. At a reaction temperature of 90° C., the resulting naphthalene sulfonic acid contains about 10% of the beta acid and 90% of the alpha acid while at a reaction temperature of 140° C., it contains approximately 75% of the beta acid and 25% of the alpha acid. It is the latter product which is compared hereinbefore with the product of the present invention.

The temperature during the reaction of naphthalene sulfonic acid with formaldehyde may also be varied. The use of higher temperatures speeds the reaction but excessively high temperatures results in an inferior product. In fact ordinary room temperature may be used throughout except for the final baking, but the time required in such case is excessively long.

The step of washing out excess acid may be avoided by using in the sulfonating step substantially the amount of sulfonating agent theoretically required to provide the naphthalene monosulfonic acid and the desired excess or deficiency of acid. For example, 1 mol of naphthalene may be mixed with 1.15 mols of sulfuric acid in the form of an aqueous solution containing 98% of $H_2SO_4$ in a reaction chamber provided with agitating means at a temperature of 70° C. to 90° C. and under a reduced pressure of 600 mm. of mercury. The water formed by the sulfonation reaction is continuously removed in the form of vapor. As an alternative, benzine or carbon tetrachloride may be introduced into the reaction chamber. The temperature is maintained at 70° C. to 90° C. and the mixture of water and carbon tetrachloride or benzine is distilled in the chamber and the vapors removed azeotropically. They may be condensed outside of the chamber and the water separated from the organic liquid and the latter recirculated through the chamber until the sulfonation has gone to completion. The use of 1.15 mols of sulfuric acid for each mol of naphthalene in such procedure results in the formation of naphthalene monosulfonic acid and an excess of 0.10 to 0.15 pound of sulfuric acid per pound of naphthalene, which closely approaches theoretical results.

Other variations may be made within the scope of the invention as the same is set forth in the appended claims.

I claim:

1. An ion exchange material comprising the water insoluble resinous reaction product of formaldehyde and naphthalene sulfonic acid of which acid at least 75% is in the alpha form.

2. An ion exchange material comprising the resinous product of reacting formaldehyde with naphthalene sulfonic acid at least 75% of which is in the alpha form at a temperature below 100° C. until a solid substantially water insoluble product is formed.

3. The method of making an ion exchange material, which comprises contacting 1 mol of naphthalene sulfonic acid at least 75% of which is in the alpha form with an aqueous solution of formaldehyde containing approximately 1.0 to 2.5 mols of formaldehyde while maintaining the mixture at a temperature not exceeding 100° C. until a solid water insoluble resinous product is formed, washing the solid product with water and baking the washed product at a temperature not exceeding 150° C. to dry and indurate the same.

4. The method as claimed in claim 3 in which the naphthalene sulfonic acid is added to the formaldehyde solution.

5. The method as claimed in claim 3 in which the washing is continued until the residual acidity of the washed product is from 0.3 pound less to 0.4 pound more, expressed as sulfuric acid per pound of naphthalene, than the amount theoretically required to produce naphthalene monosulfonic acid.

6. The method as claimed in claim 3 in which the washing is continued until the residual acidity of the washed product is 0.1 pound more, expressed as sulfuric acid per pound of naphthalene, than the amount theoretically required to produce naphthalene monosulfonic acid.

7. The method of making an ion exchange material which comprises contacting naphthalene sulfonic acid at least 75% of which is in the alpha form with formaldehyde until a solid water insoluble resinous product is obtained, washing said resinous product with water, and baking said washed product to dry and indurate the same.

8. The method of effecting ion exchange in a liquid solution, which comprises bringing said solution in contact with the water insoluble resinous reaction product of formaldehyde and naphthalene sulfonic acid at least 75% of which is in the alpha form.

9. The method of making an ion exchange material which comprises contacting naphthalene sulfonic acid at least 75% of which is in the alpha form with formaldehyde until a solid, water insoluble, resinous product is obtained.

STANLEY H. FROHMADER.

REFERENCES CITED

The following references are of record in the file of this patent:

UNITED STATES PATENTS

| Number | Name | Date |
| --- | --- | --- |
| 2,204,539 | Wasenegger et al. | June 11, 1940 |

OTHER REFERENCES

Groggins Unit Processes in Organic Synthesis, McGraw Hill, 1935, page 243.